(12) United States Patent
Ko et al.

(10) Patent No.: US 9,603,137 B2
(45) Date of Patent: Mar. 21, 2017

(54) METHOD AND APPARATUS FOR TRANSCEIVING CONTROL INFORMATION IN A WIRELESS COMMUNICATION SYSTEM

(71) Applicant: LG ELECTRONICS INC., Seoul (KR)

(72) Inventors: Hyunsoo Ko, Anyang-si (KR); Kitae Kim, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 328 days.

(21) Appl. No.: 14/350,790

(22) PCT Filed: Oct. 10, 2012

(86) PCT No.: PCT/KR2012/008197
§ 371 (c)(1),
(2) Date: Apr. 9, 2014

(87) PCT Pub. No.: WO2013/055092
PCT Pub. Date: Apr. 18, 2013

(65) Prior Publication Data
US 2014/0328295 A1 Nov. 6, 2014

Related U.S. Application Data

(60) Provisional application No. 61/545,553, filed on Oct. 10, 2011.

(51) Int. Cl.
H04W 72/04 (2009.01)
H04L 5/00 (2006.01)
(Continued)

(52) U.S. Cl.
CPC ......... *H04W 72/042* (2013.01); *H04L 1/0038* (2013.01); *H04L 5/0044* (2013.01); *H04L 5/0053* (2013.01); *H04B 7/2656* (2013.01)

(58) Field of Classification Search
CPC .................................................. H04W 72/042
See application file for complete search history.

(56) References Cited

U.S. PATENT DOCUMENTS

2011/0085513 A1* 4/2011 Chen ................... H04W 72/042
370/330
2011/0110444 A1* 5/2011 Roh ....................... H04L 1/0003
375/260

(Continued)

FOREIGN PATENT DOCUMENTS

KR 10-2010-0113032 10/2010
KR 10-2011-0000538 1/2011

(Continued)

OTHER PUBLICATIONS

PCT International Application No. PCT/KR2012/008197, Written Opinion of the International Searching Authority dated Mar. 20, 2013, 18 pages.

*Primary Examiner* — Robert M Morlan
*Assistant Examiner* — Nourali Mansoury
(74) *Attorney, Agent, or Firm* — Lee, Hong, Degerman, Kang & Waimey

(57) ABSTRACT

An embodiment of the present invention relates to a method in which a base station transmits a signal in a wireless communication system, said method comprising: a step of allocating downlink control information to either a first slot or a second slot of a subframe; a step of allocating data related to said downlink control information to the slot to which said downlink control information is allocated; and a step of transmitting the subframe including said downlink control information and said data. The downlink control (Continued)

information is allocated to one or more resource block, and the data is allocated to the slot paired with the slot to which the downlink control information is allocated.

20 Claims, 11 Drawing Sheets

(51) Int. Cl.
*H04L 1/00* (2006.01)
*H04B 7/26* (2006.01)

(56) References Cited

U.S. PATENT DOCUMENTS

| | | | | |
|---|---|---|---|---|
| 2011/0223924 A1* | 9/2011 | Lohr | ................... | H04W 72/042 455/450 |
| 2012/0008591 A1* | 1/2012 | Miki | ....................... | H04J 13/16 370/330 |
| 2012/0033627 A1* | 2/2012 | Li | ......................... | H04L 5/0007 370/329 |
| 2012/0039283 A1* | 2/2012 | Chen | ................... | H04W 72/042 370/329 |
| 2012/0207084 A1* | 8/2012 | Seo | ........................ | H04B 7/155 370/315 |
| 2012/0250642 A1* | 10/2012 | Qu | ....................... | H04W 72/042 370/329 |
| 2012/0275400 A1* | 11/2012 | Chen | ................... | H04J 11/0033 370/329 |
| 2012/0327884 A1* | 12/2012 | Seo | ........................ | H04L 5/0057 370/329 |
| 2013/0064099 A1* | 3/2013 | Kim | ...................... | H04L 5/0053 370/241 |
| 2014/0016519 A1* | 1/2014 | Kim | ................... | H04W 72/1263 370/280 |

FOREIGN PATENT DOCUMENTS

| KR | 10-2011-0067025 | 6/2011 |
|---|---|---|
| KR | 10-2011-0088432 | 8/2011 |

* cited by examiner

METHOD AND APPARATUS FOR TRANSCEIVING CONTROL INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2012/008197, filed on Oct. 10, 2012, which claims the benefit of U.S. Provisional Application Ser. No. 61/545,553, filed on Oct. 10, 2011, the contents of which are all hereby incorporated by reference herein in their entirety.

TECHNICAL FIELD

The present invention relates to a method and apparatus for acquiring downlink control information in a wireless communication system.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide a method and apparatus for transceiving control information, and more particularly to a control information allocation method when e-PDCCH is applied, and user equipment (UE) operations for the same.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting a signal by a base station (BS) in a wireless communication system including: allocating downlink control information (DCI) to any one of a first slot and a second slot of a subframe; allocating data associated with the downlink control information (DCI) to a slot different from the slot used for DCI allocation; and transmitting a subframe including the downlink control information (DCI) and the data, wherein the downlink control information (DCI) is allocated to one or more resource block (RB), and the data is allocated to a slot paired with the slot used for the DCI allocation.

In a second technical aspect of the present invention, a method for receiving a signal by a user equipment (UE) in a wireless communication system includes: performing blind decoding for downlink control information (DCI) at any one of a first slot and a second slot of a subframe; and acquiring data associated with the downlink control information (DCI) at a slot different from the slot at which the blind decoding is performed for the downlink control information (DCI), wherein a search space in which blind decoding is performed for the downlink control information (DCI) corresponds to one or more resource block (RB), and the data is obtained from a slot paired with a specific slot corresponding to the search space.

In a third technical aspect of the present invention, a base station (BS) device for use in a wireless communication system includes: a transmission (Tx) module; and a processor, wherein the processor allocates downlink control information (DCI) to any one of a first slot and a second slot of a subframe, allocates data associated with the downlink control information (DCI) to a slot different from the slot used for DCI allocation, and transmits a subframe including the downlink control information (DCI) and the data, wherein the downlink control information (DCI) is allocated to one or more resource block (RB), and the data is allocated to a slot paired with the slot used for the DCI allocation.

In a fourth technical aspect of the present invention, a user equipment (UE) device for use in a wireless communication system includes: a reception (Rx) module; and a processor, wherein the processor performs blind decoding for downlink control information (DCI) at any one of a first slot and a second slot of a subframe, and acquires data associated with the downlink control information (DCI) at a slot different from the slot at which the blind decoding is performed for the downlink control information (DCI), wherein a search space in which blind decoding is performed for the downlink control information (DCI) corresponds to one or more resource block (RB), and the data is obtained from a slot paired with a specific slot corresponding to the search space.

The first to fourth technical aspects may include all or some parts of the following items.

The downlink control information (DCI) may be for cell-specific control information.

The data may be for user equipments (UEs) to be used for reception of the downlink control information (DCI).

The slot to which the downlink control information (DCI) is allocated may be predetermined.

The slot to which the downlink control information (DCI) is allocated may be decided through higher layer signaling.

The slot to which the downlink control information (DCI) is allocated may be decided according to a transmission (Tx) mode.

Advantageous Effects

As is apparent from the above description, the embodiments of the present invention can efficiently allocate resources when E-PDCCH is transmitted within one slot.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

Figure 1:
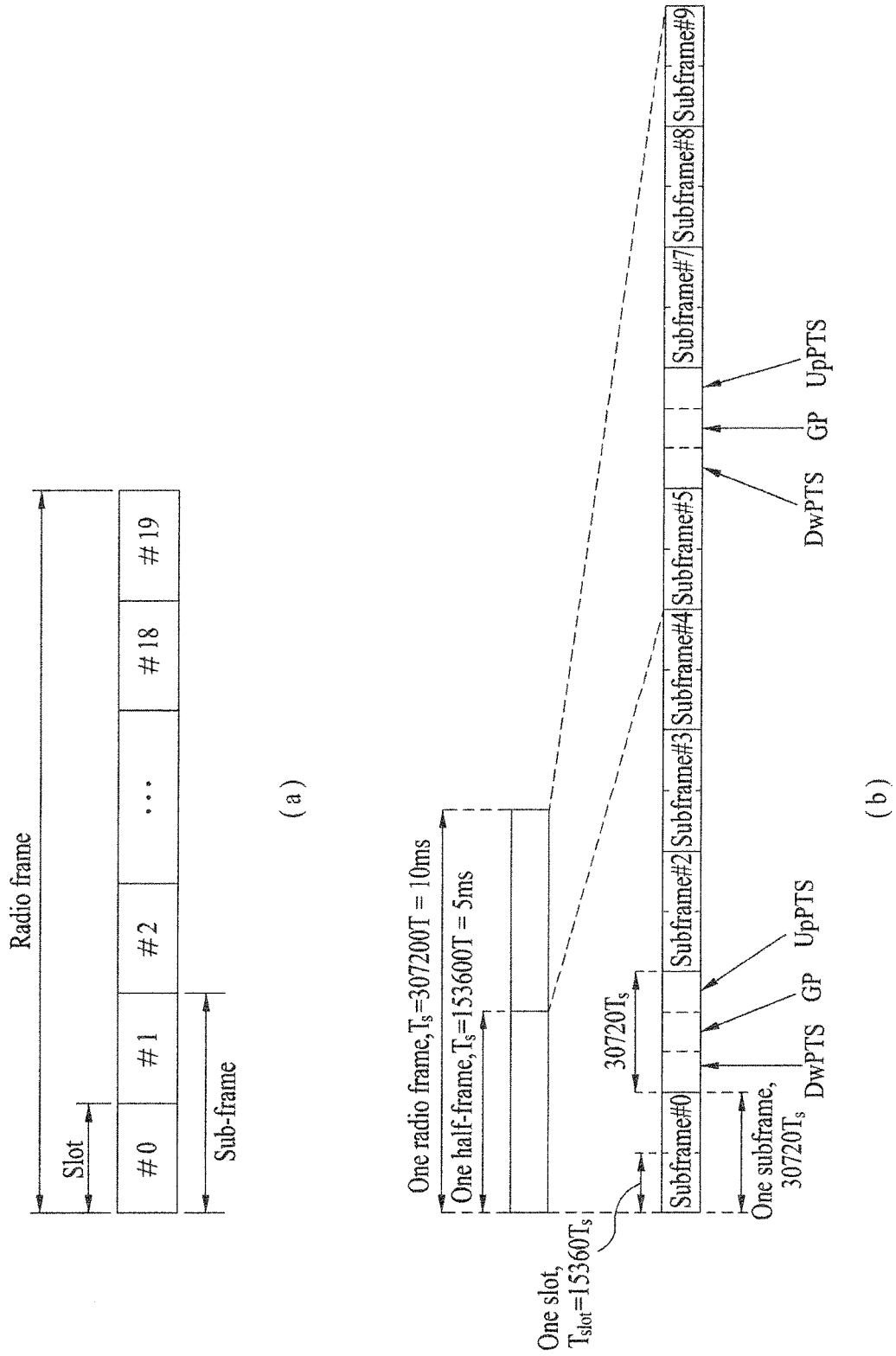
FIG. 1 exemplarily shows a downlink radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

FIG. 1 exemplarily shows a radio frame structure for use in the LTE system. Referring to FIG. 1(a), a radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in time domain. Since the LTE system uses OFDMA in downlink, the OFDM symbol indicates one symbol duration. One OFDM symbol may be called an SC-FDMA symbol or a symbol duration. An RB is a resource allocation unit and includes a plurality of contiguous subcarriers in one slot. The structure of the radio frame is only exemplary. Accordingly, the number of subframes included in one radio frame, the number of slots included in one subframe, or the number of OFDM symbols included in one slot may be changed in various manners.

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal.

The structure of the radio frame is only exemplary. Accordingly, the number of subframes included in the radio frame, the number of slots included in the subframe or the number of symbols included in the slot may be changed in various manners.

Figure 2:
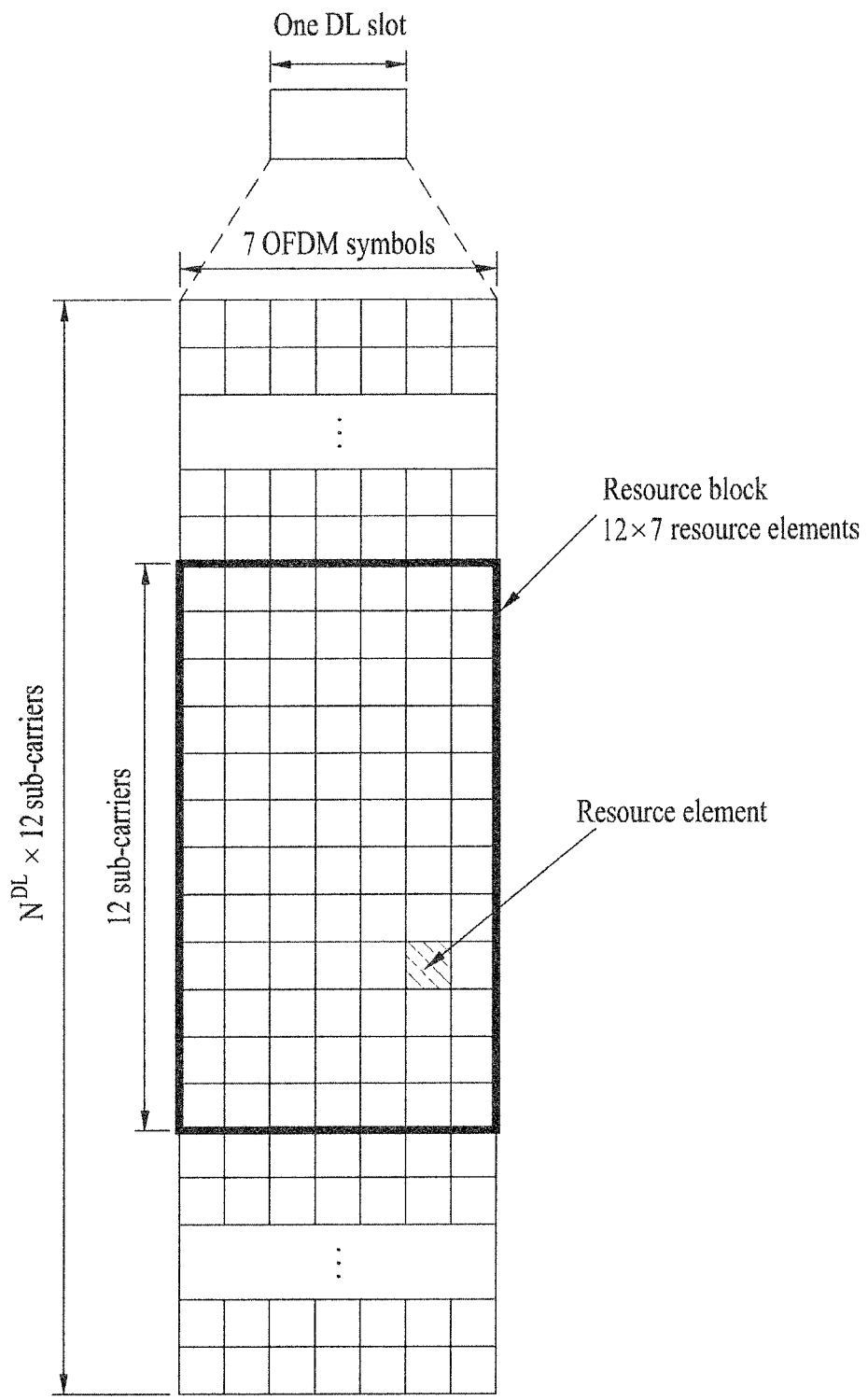
FIG. 2 exemplarily shows a resource grid of one downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
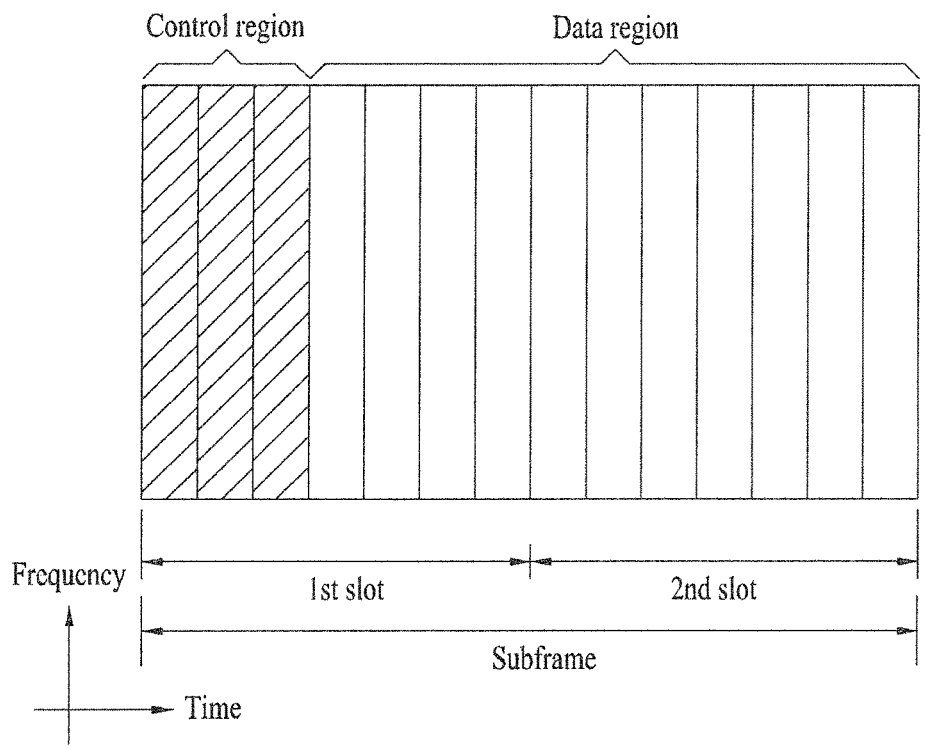
FIG. 3 exemplarily shows a downlink subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc.

PCFICH is transmitted at a first OFDM symbol of a subframe, and includes information about the number of OFDM symbols used to transmit the control channel in the subframe.

PHICH includes a HARQ ACK/NACK signal as a response to uplink transmission.

The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. PDCCHs are transmitted as an aggregate of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
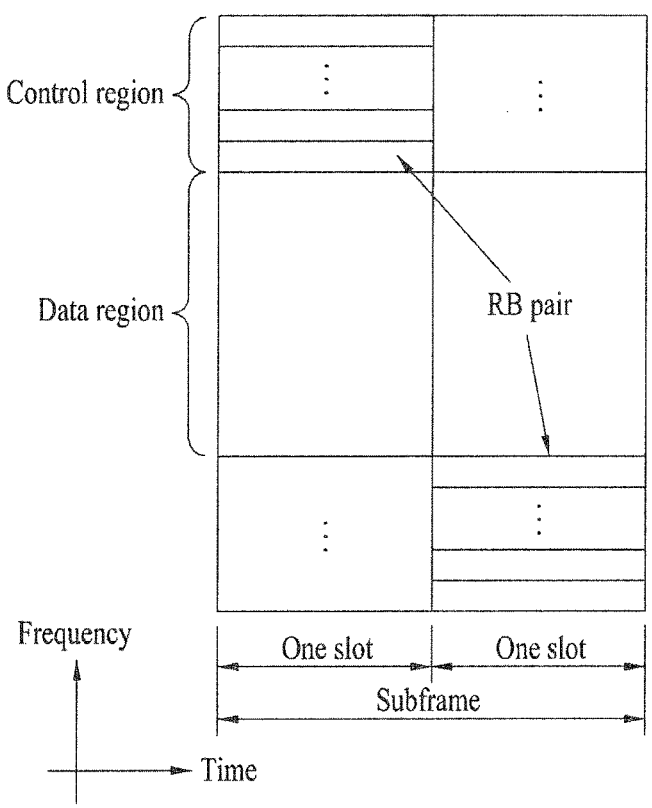
FIG. 4 exemplarily shows an uplink subframe structure.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

DCI Format

DCI formats 0, 1, 1A, 1B, 1C, 1D, 2, 2A, 2B, 2C, 3, 3A and 4 are defined in LTE-A (release 10). DCI formats 0, 1A, 3 and 3A have the same message size to reduce the number of blind decoding operations, which will be described later. The DCI formats may be divided into i) DCI formats 0 and 4 used for uplink scheduling grant, ii) DCI formats 1, 1A, 1B, 1C, 2, 2A, 2B and 2C used for downlink scheduling allocation, and iii) DCI formats 3 and 3A for power control commands according to purpose of control information to be transmitted.

DCI format 0 used for uplink scheduling grant may include a carrier indicator necessary for carrier aggregation which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission with respect to an HARQ process, a transmit power control (TPC) command for a scheduled PUSCH, information on a cyclic shift for a demodulation reference signal (DMRS) and OCC index, and an uplink index and channel quality indicator request necessary for a TDD operation, etc. DCI format 0 does not include a redundancy version, differently from DCI formats relating to downlink scheduling allocation, because DCI format 0 uses synchronous HARQ. The carrier offset is not included in DCI formats when cross-carrier scheduling is not used.

DCI format 4 is newly added to DCI formats in LTE-A release 10 and supports application of spatial multiplexing to uplink transmission in LTE-A. DCI format 4 has a larger message size because it further includes information for spatial multiplexing. DCI format 4 includes additional control information in addition to control information included in DCI format 0. DCI format 4 includes information on a modulation and coding scheme for the second transmission block, precoding information for multi-antenna transmission, and sounding reference signal (SRS) request information. DCI format 4 does not include the offset for format 0/format 1A differentiation because it has a size larger than DCI format 0.

DCI formats 1, 1A, 1B, 1C, 1D, 2, 2A, 2B and 2C for downlink scheduling allocation may be divided into DCI formats 1, 1A, 1B, 1C and 1D that do not support spatial multiplexing and DCI formats 2, 2A, 2B and 2C that support spatial multiplexing.

DCI format 1C supports only frequency contiguous allocation as compact frequency allocation and does not include the carrier indicator and redundancy version, compared to other formats.

DCI format 1A is for downlink scheduling and random access procedure. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission with respect to a HARQ process, a TPC command for a PUCCH, an uplink index necessary for a TDD operation, etc.

DCI format 1 includes control information similar to that of DCI format 1A. DCI format 1 supports non-contiguous resource allocation whereas DCI format 1A supports contiguous resource allocation. Accordingly, DCI format 1 further includes a resource allocation header, and thus slightly increases control signaling overhead as a trade-off for an increase in resource allocation flexibility.

Both DCI formats 1B and 1D further include precoding information, compared to DCI format 1. DCI format 1B includes PMI acknowledgement and DCI format 1D includes downlink power offset information. Most control information included in DCI formats 1B and 1D corresponds to that of DCI format 1A.

DCI formats 2, 2A, 2B and 2C include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C may be regarded as an extended version of DCI format 2B and supports spatial multiplexing for up to 8 layers.

DCI formats 3 and 3A may be used to complement the TPC information included in the aforementioned DCI formats for uplink scheduling grant and downlink scheduling allocation, that is, to support semi-persistent scheduling. A 1-bit command is used per UE in the case of DCI format 3 whereas a 2-bit command is used per UE in the case of DCI format 3A.

One of the above-mentioned DCI formats is transmitted through a PDCCH, and a plurality of PDCCHs may be transmitted in a control region. A UE can monitor the plurality of PDCCHs.

Downlink Control Channel Structure

The first three OFDM symbols for each subframe can be basically used as a transmission region of a downlink control channel, and the first to third OFDM symbols may be used according to overhead of a downlink control channel. PCFICH may be used to adjust the number of OFDM symbols for a downlink control channel per subframe. In order to provide acknowledgement/negative acknowledgment (ACK/NACK) information for uplink transmission on downlink, a Physical Hybrid-automatic repeat request (ARQ) Indicator Channel (PHICH) may be used. In addition, a PDCCH may be used to transmit either control information for downlink data transmission or control information for uplink data transmission.

Figure 5:
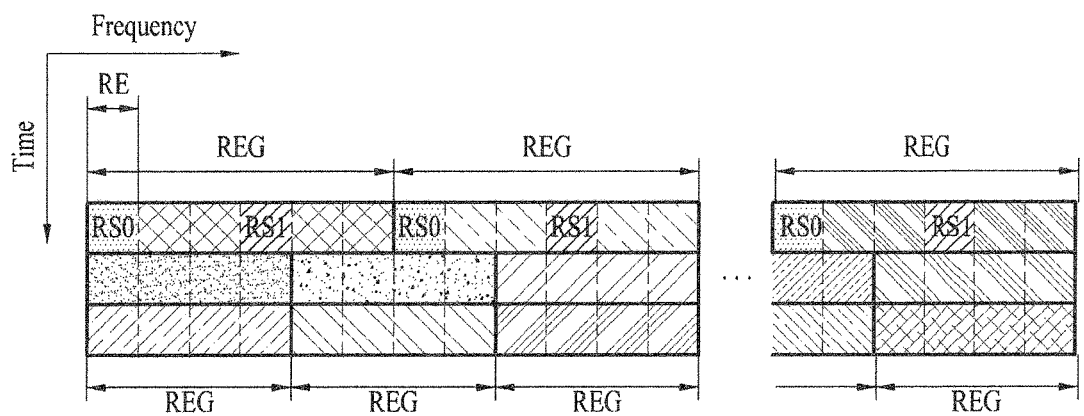
FIGS. 5 and 6 exemplarily show a resource element group (REG) serving as an allocation unit of a downlink control channel.
Figure 6:
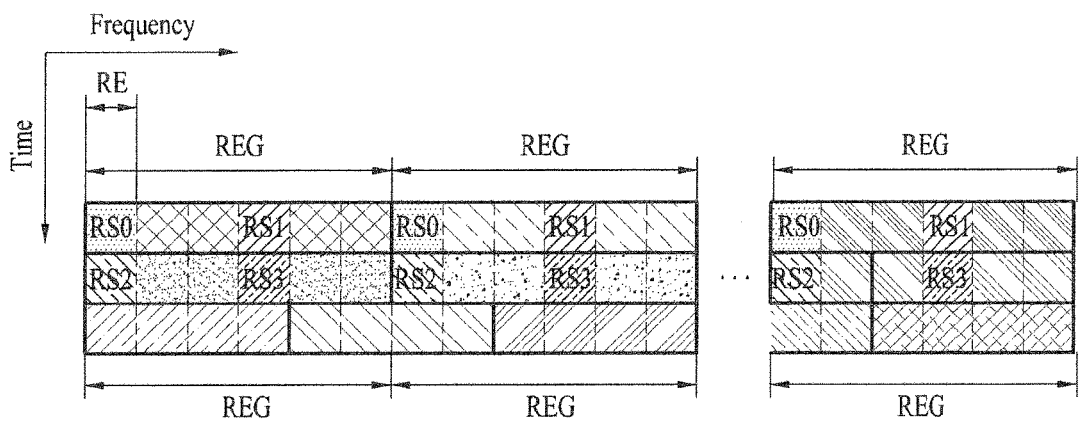

FIGS. 5 and 6 exemplarily show that the above-mentioned downlink control channels are allocated in units of a resource element group (REG) in a control region for each subframe. In more detail, FIG. 5 shows a system having 1Tx antenna or 2Tx antennas, and FIG. 6 shows a system having 4Tx antennas. As can be seen from FIGS. 5 and 6, an REG serving as a basic resource unit to which a control channel is allocated is composed of 4 concatenated resource elements (REs) in a frequency domain other than some REs to which reference signals are allocated. A predetermined number of REGs may be used to transmit a downlink control channel according to downlink control channel (DCH) overhead.

PCFICH (Physical Control Format Indicator Channel)

In order to provide resource allocation information or the like of the corresponding subframe to each subframe, a PDCCH may be transmitted among OFDM symbol indices #0 to #2. In accordance with overhead of a control channel, an OFDM symbol index #0 may be used, OFDM symbol indices #0 and #1 may be used, or OFDM symbol indices #0 to #2 may be used. The number of OFDM symbols used by a control channel may be changed per subframe, and information regarding the number of OFDM symbols may be provided over a PCFICH. Therefore, PCFICH must be transmitted per subframe.

Three kinds of information can be provided through a PCFICH. The following Table 1 shows a Control Format Indicator of a PCFICH. CFI=1 denotes that a PDCCH is transmitted at OFDM symbol index #0, CFI=2 denotes that a PDCCH is transmitted at OFDM symbol indices #0 and #1, and CFI=3 denotes that a PDCCH is transmitted at OFDM symbol indices #0 to #2.

TABLE 1

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Information transmitted over a PCFICH may be differently defined according to system bandwidth. For example, if a system bandwidth is less than a specific threshold value, CFI=1, CFI=2, and CFI=3 may indicate that two OFDM symbols, three OFDM symbols, and four OFDM symbols are used for a PDCCH, respectively.

Figure 7:
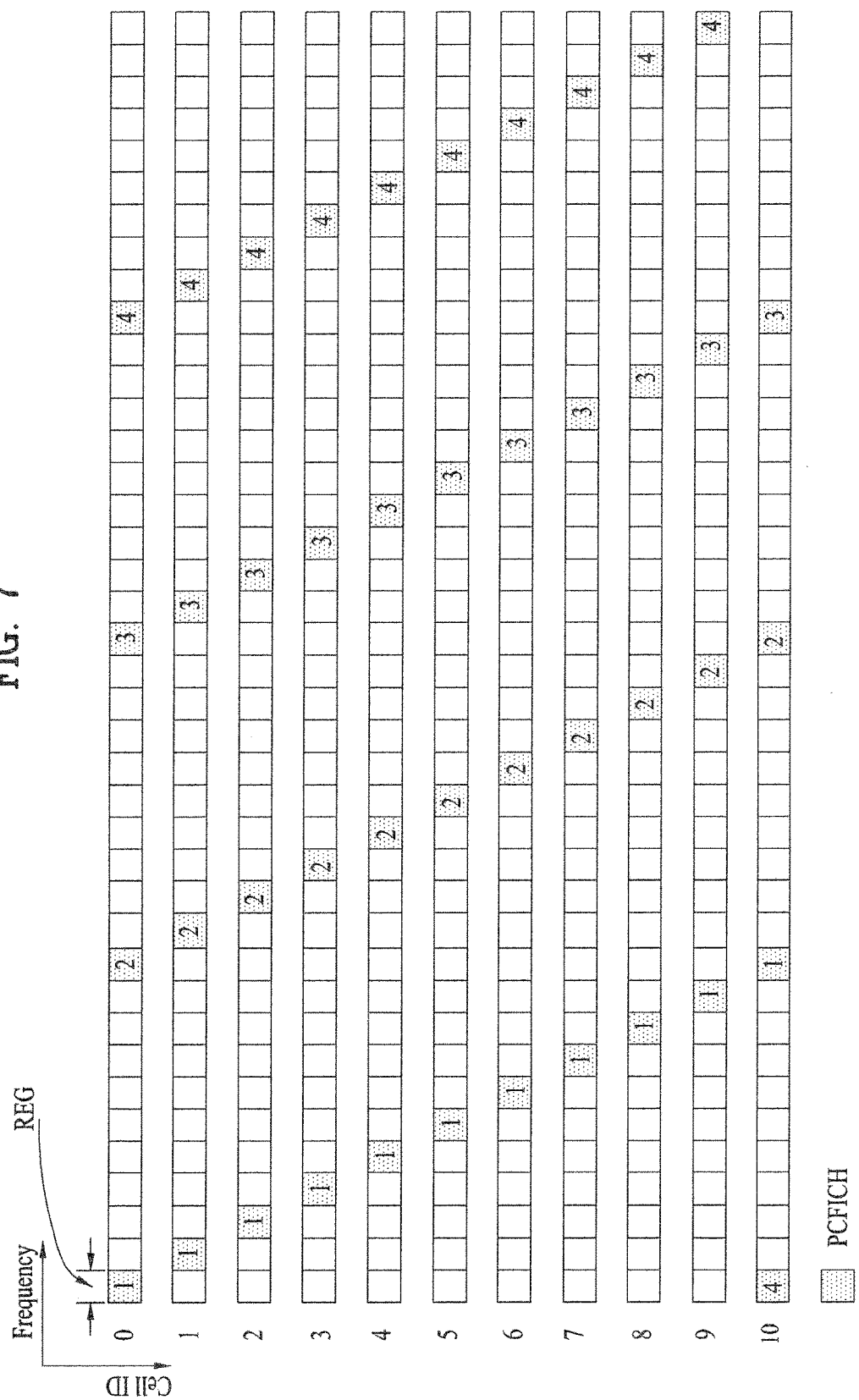
FIG. 7 is a conceptual diagram illustrating a Physical Control Format Indicator Channel (PCFICH) transmission scheme.

FIG. 7 is a conceptual diagram illustrating a PCFICH transmission scheme. An REG shown in FIG. 7 may be composed of 4 subcarriers, and may be composed only of data subcarriers other than a reference signal (RS). Generally, a transmit diversity scheme may be applied to the REG. To prevent inter-cell interference of the PCFICH, the REGs to which the PCFICH is mapped may be shifted per cell in the frequency domain (according to a cell ID). The PCFICH is transmitted at the first OFDM symbol of a subframe all the time. Accordingly, when receiving a subframe, the receiver first confirms PCFICH information, and recognizes the number of OFDM symbols needed for PDCCH transmission, such that it can receive control information transmitted over a PDCCH.

Physical Hybrid-ARQ Indicator Channel (PHICH)

Figure 8:
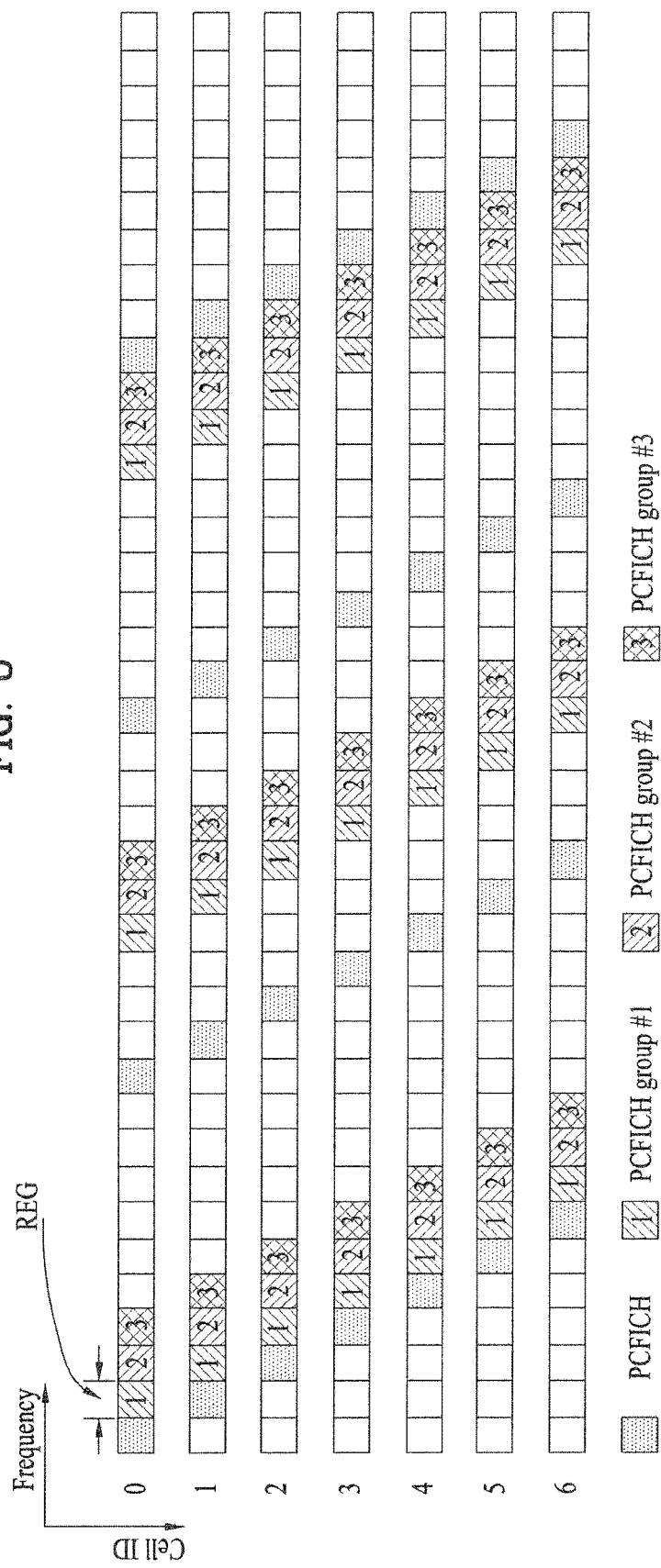
FIG. 8 shows the positions of a PCFICH and a Physical hybrid ARQ indicator Channel (PHICH).

FIG. 8 shows the positions of PCFICH and PHICH generally applied to a specific bandwidth. ACK/NACK information for uplink data transmission is transmitted over a PHICH. A plurality of PHICH groups is constructed in a single subframe, and a plurality of PHICHs may be present in a single PHICH group. Therefore, PHICH channels for multiple UEs are contained in a single PHICH group.

Referring to FIG. 8, allocating a PHICH to each UE of a plurality of PHICH groups is achieved not only using a lowest physical resource block (PRB) index of a PUSCH resource allocation but also a cyclic shift (CS) index for a demodulation RS (DMRS) transmitted on a UL grant PDCCH. DMRS is an uplink reference signal, and is provided along with UL transmission so as to perform channel estimation for demodulating UL data. In addition, a PHICH resource is signaled as an index pair such as ($n_{PHICH}^{group}$, $n_{PHICH}^{seq}$). In the index pair ($n_{PHICH}^{group}$, $n_{PHICH}^{seq}$), $n_{PHICH}^{group}$ denotes a PHICH group number and $n_{PHICH}^{seq}$ denotes an orthogonal sequence index in the corresponding PHICH group. $n_{PHICH}^{group}$ and $n_{PHICH}^{seq}$ are defined as shown in the following equation 1.

$$n_{PHICH}^{group} = (I_{PRB\_RA}^{lowest\_index} + n_{DMRS}) \bmod N_{PHICH}^{group} \quad \text{[Equation 1]}$$

$$n_{PHICH}^{seq} = (\lfloor I_{PRB\_RA}^{lowest\_index} / N_{PHICH}^{group} \rfloor n_{DMRS}) \bmod 2N_{SF}^{PHICH}$$

In Equation 1, $n_{DMRS}$ denotes a cyclic shift of a DMRS used for uplink transmission related to a PHICH, and is mapped to a value of 'cycle shift for DMRS' field of the latest UL grant control information (e.g., DCI format 0 or 4) for a transport block (TB) associated with the corresponding PUSCH transmission. For example, the 'cyclic shift for DMRS' field of the latest UL grant DCI format may be 3 bits long. If the 'cyclic shift for DMRS' field is set to "000", $n_{DMRS}$ may be set to zero '0'.

In Equation 1, $N_{SF}^{PHICH}$ denotes the size of a spreading factor used for PHICH modulation. $I_{PRB\_RA}^{lowest\_index}$ is the lowest PRB index of a first slot of the corresponding PUSCH transmission. $I_{PHICH}$ is set to the value of 1 only when the TDD system is in a special case (if UL/DL configuration is set to zero '0' and PUSCH transmission is achieved at subframe n=4 or n=9, and $I_{PHICH}$ is set to zero '0' in the remaining cases other than the special case. $N_{PHICH}^{group}$ denotes the number of PHICH groups configured by a higher layer. $N_{PHICH}^{group}$ can be obtained using the following equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases} \quad \text{[Equation 2]}$$

In Equation 2, $N_g$ denotes information regarding the amount of PHICH resources transmitted on a physical broadcast channel (PBCH), and $N_g$ is 2 bits long and is denoted by $N_g \in \{1/6, 1/2, 1, 2\}$. In Equation 2, $N_{RB}^{DL}$ denotes the number of resource blocks (RBs) configured in downlink.

In addition, examples of orthogonal sequences defined in the legacy 3GPP LTE Release 8/9 are shown in the following table 2.

TABLE 2

| Sequence index $n_{PHICH}^{seq}$ | Orthogonal sequence Normal cyclic prefix $N_{SF}^{PHICH} = 4$ | Extended cyclic prefix $N_{SF}^{PHICH} = 2$ |
|---|---|---|
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 9:
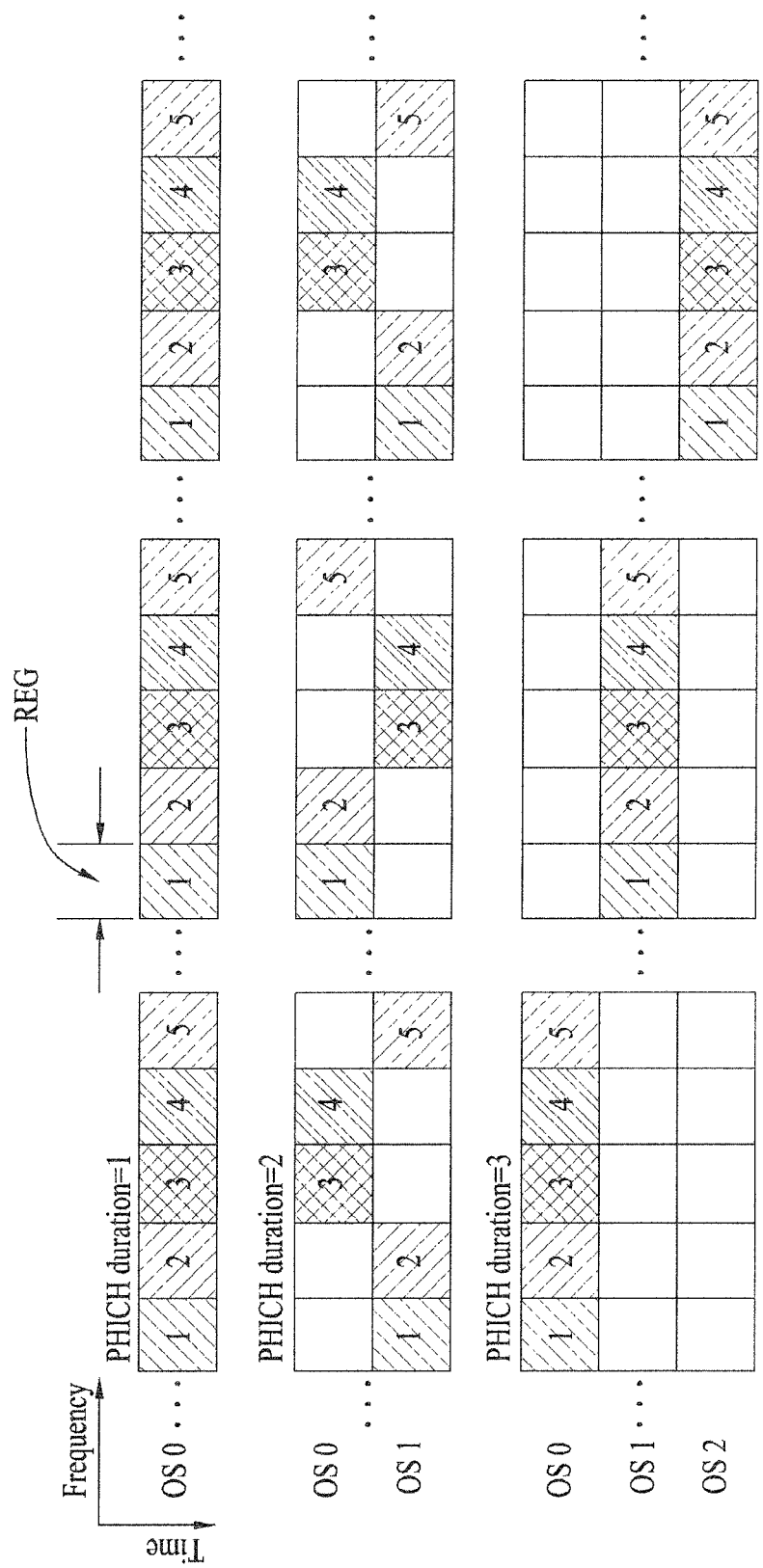
FIG. 9 shows a downlink resource element position mapped to a PHICH group.

FIG. 9 shows a downlink resource element position mapped to a PHICH group. A PHICH group may be constructed in different time domains (i.e., different OFDM Symbols (OSs)) of a single subframe shown in FIG. 9 according to PHICH duration.

PDCCH Processing

When PDCCHs are mapped to REs, control channel elements (CCEs) corresponding to contiguous logical allocation units are used. A CCE includes a plurality of (e.g. 9) REGs and an REG includes 4 neighboring REs except for a reference signal (RS).

The number of CCEs necessary for a specific PDCCH depends on a DCI payload corresponding to control information size, cell bandwidth, channel coding rate, etc. Specifically, the number of CCEs for a specific PDCCH can be determined based on PDCCH format shown in Table 3.

TABLE 8

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

While one of the above-mentioned four PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 4.

TABLE 4

| Search space | Aggregation level | Size (CCE unit) | The number of PDCCH candidates |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 4, the UE has a plurality of search spaces at each aggregation level because 4 aggregation levels are present. The search spaces may be divided into a UE-specific search space (USS) and a common search space (CSS), as shown in Table 4. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs need to receive PDCCHs, for system information dynamic scheduling or paging messages, for example. The common search space may be used for a specific UE for resource management. Furthermore, the common search space may overlap with the UE-specific search space.

The search space may be decided by the following equation 3.

$$L \cdot \{(Y_k + m') \bmod \lfloor N_{CCE,k}/L \rfloor\} + i \qquad [\text{Equation 3}]$$

In Equation 3, L is an aggregation level, $Y_k$ is a variable decided by RNTI and subframe number (k), m' is the number of PDCCH candidates. If carrier aggregation (CA) is used, m' is denoted by $m' = m + M^{(L)} \cdot n_{CI}$. If CA is not used, m' is denoted by m'=m, where m=0, . . . , $M^{(L)}-1$. $M^{(L)}$ is the number of PDCCH candidates. $N_{CCE,k}$ is a total number of CCEs of a control region at the k-th subframe. i is an index for determination of a separate CCE in each PDCCH candidate in the PDCCH and satisfies i=0, . . . , L–1. In a common search space, $Y_k$ is always set to zero '0'.

Figure 10:
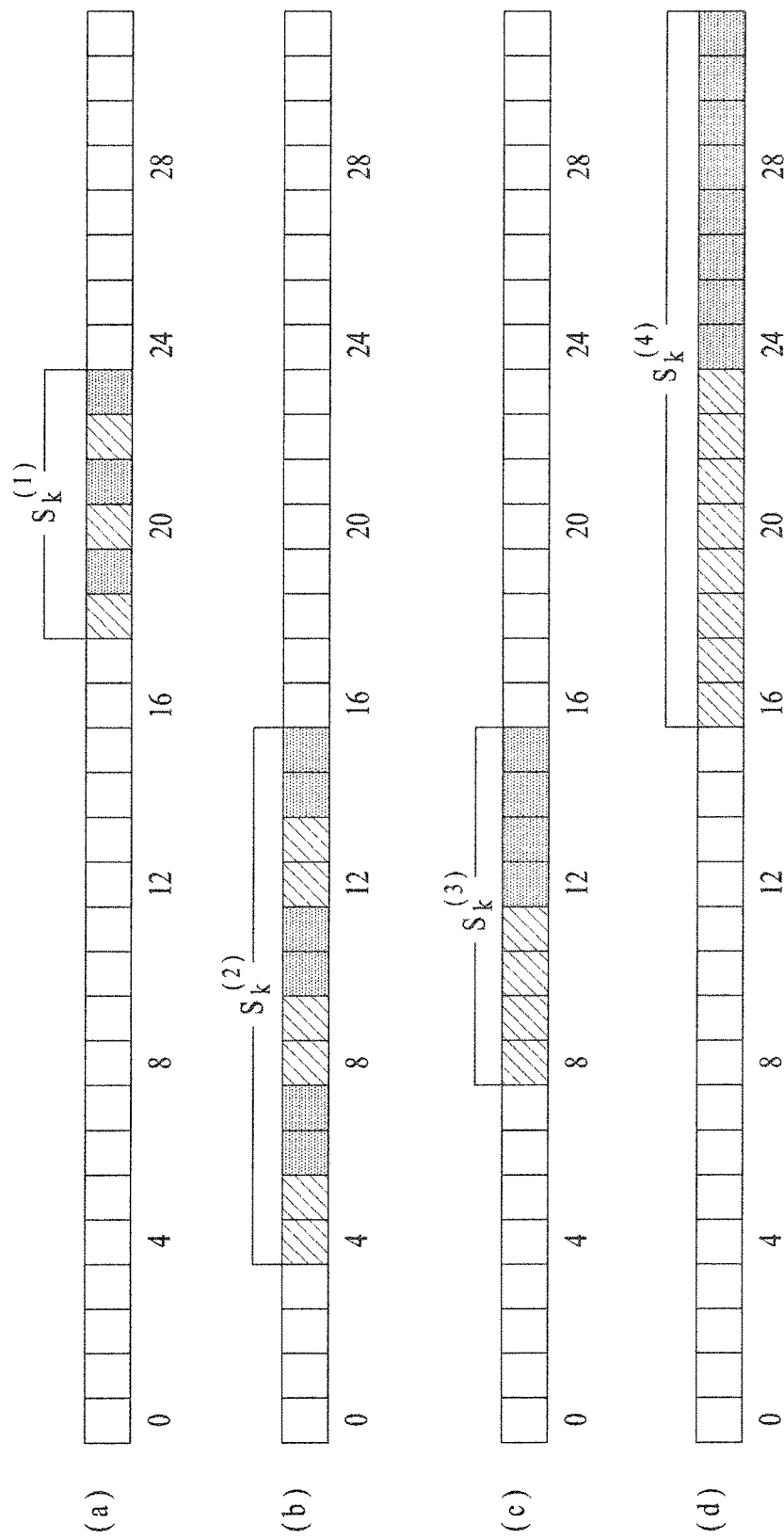
FIG. 10 is a conceptual diagram illustrating a search space.

FIG. 10 is a conceptual diagram illustrating a UE-specific search space (shaded part) in each aggregation level defined by Equation 3. In FIG. 10, it should be noted that carrier aggregation (CA) is not used and the number of $N_{CCE,k}$ is exemplarily set to 32.

FIGS. 10(a), 10(b), 10(c), and 10(d) show a case of an aggregation level '1', a case of an aggregation level '2', a case of an aggregation level '4', and a case of an aggregation level '8', respectively. In FIG. 10, a start CCE of a search space in each aggregation level is determined to be an RNTI and subframe number (k), and may have different values according to individual aggregation levels due to a modulo function and an aggregation level (L) within the same subframe for one UE. The start CCE may always be set only to a multiple of an aggregation level due to the aggregation level (L). In this case, it is premised that $Y_k$ is set to, for example, a CCE number #18. The UE attempts to sequentially perform decoding from the beginning of a start CCE in units of CCEs decided by the corresponding aggregation level. For example, as can be seen from FIG. 10(b), the UE attempts to perform decoding on the basis of two CCEs according to an aggregation level from the beginning of a CCE number #4 acting as a start CCE.

The UE attempts to decode a search space, as described above. The number of decoding attempts is determined by DCI format and transmission mode determined through RRC signaling. When carrier aggregation (CA) is not applied, the UE needs to perform a maximum of 12 decoding attempts because 2 DCI sizes (DCI format 0/1A/3/3A and DCI format 1C) have to be considered for each of 6 PDCCH candidates for a common search space. For a UE-specific search space, 2 DCI sizes are considered for (6+6+2+2=16) PDCCH candidates and thus a maximum of 32 decoding attempts is needed. Accordingly, a maximum of 44 decoding attempts needs to be performed when carrier aggregation (CA) is not applied.

On the other hand, if carrier aggregation (CA) is used, as many UE-specific search space as the number of DL resources (component carriers: CCs) and a decoding process for DCI format 4 are further added, such that a maximum number of decoding times can be increased indefinitely.

In 3GPP LTE Rel-8/9/10, a control signal is transmitted through a physical downlink control channel (PDCCH). In Rel-11, an improved PDCCH design is considered to solve PDCCH capacity limitation and a decoding problem caused by inter-cell interference between PDCCHs transmitted from different Tx points in CA(Carrier Aggregation)/CoMP (Coordinate Multi Point)/MIMO(Multiple Input Multiple Output)/MTC(Machine Type Communication)/HetNet (Heterogeneous Network). In a first step, a design concept of R-PDCCH designed to support a relay in Rel-10 may be used. R-PDCCH is designed to use a cell-specific reference signal (CRS) and is also designed to use a UE-specific reference signal (Demodulation RS). In E-PDCCH design, the E-PDCCH design is based on a scheme for using DMRS of a PDSCH region to acquire a cell splitting gain.

A resource allocation scheme for current data is based on an RB basis. RB is composed of 2 slots, and each slot constructs a pair within one RB. For example, according to the localized resource allocation scheme, 2 slots located in the same frequency band construct one RB pair. According to the distributed resource allocation scheme, 2 slots located in different frequency bands construct one RB pair.

However, if E-PDCCH is allocated to a specific slot, i.e., many resource blocks (RBs) are allocated for E-PDCCH in a specific slot and slots paired with these RBs may remain empty. For example, assuming that E-PDCCH is allocated only to the $1^{st}$ slot, the $2^{nd}$ slot can be used for data (PDSCH). E-PDCCH may be transmitted using a plurality of layers so as to perform multiplexing of many UEs. In this case, a UE multiplexed with E-PDCCH may be different from a UE multiplexed with a PDSCH transmitted through a slot paired with an RB used for E-PDCCH transmission. In addition, if a common search space is defined in E-PDCCH, a common search space (CSS) is commonly seen by all UEs, control information and data of different UEs may be transmitted not only to a slot for E-PDCCH but also to a slot for PDSCH in RB allocated for CSS. In this case, the resource allocation scheme for transmitting data to a slot paired with an RB used for E-PDCCH, and/or a behavior of UE designed to detect the resource allocation scheme needs to be defined. A variety of associated embodiments will hereinafter be described in detail.

First, E-PDCCH may be transmitted to a first slot of the RB pair, and PDSCH may be transmitted to a second slot of the RB pair. That is, downlink control information is transmitted in a data region other than a control region indicated by PCFICH at a first slot, and a PDSCH for a UE desired to receive the downlink control information may be transmitted at a second slot. Of course, although the above-mentioned description can be applied to one case in which E-PDCCH is transmitted to a second slot and PDSCH is transmitted to a first slot, E-PDCCH may be transmitted at the first slot in consideration of UE processing for the HARQ process.

Second, a slot for PDSCH transmission may be decided according to a Tx mode. A transmission mode defined in the legacy LTE/LTE-A system is shown in Table 5. The BS transmits information regarding a Tx mode through UE-specific higher layer signaling according to a channel status associated with the UE.

and associated PDSCH may be transmitted at a second slot. For example, in case of Tx mode #1, a PDSCH associated with DCI may be transmitted at a first slot. That is, a slot for PDSCH transmission may be decided according to the Tx mode. In this case, the relationship between the Tx mode and the slot for PDSCH transmission is only exemplary, and this relationship may be achieved by various combinations as necessary.

In addition, a slot for PDSCH transmission may be decided according to a more detailed DCI format during the

TABLE 5

| Transmission (Tx) mode | (DCI format) | Search Space | Transmission scheme of PDSCH corresponding to PDCCH |
|---|---|---|---|
| Mode 1 | 1A | Common search space (CSS) and UE-specific search space (Common and UE specific by C-RNTI) | Single antenna port, Port 0 |
|  | 1 | UE-specific search space (UE specific by C-RNTI) | Single antenna port, Port 0 |
| Mode 2 | 1A | Common search space (CSS) and UE-specific search space | Transmit diversity |
|  | 1 | UE-specific search space | Transmit diversity |
| Mode 3 | 1A | Common search space (CSS) and UE-specific search space | Transmit diversity |
|  | 2A | UE-specific search space | Large delay cyclic delay diversity (CDD) or Tx diversity |
| Mode 4 | 1A | Common search space (CSS) and UE-specific search space | Transmit diversity |
|  | 2 | UE-specific search space | Closed Loop Spatial Multiplexing or Closed Loop Spatial Multiplexing or Transmit Diversity |
| Mode 5 | 1A | Common search space (CSS) and UE-specific search space | Transmit diversity |
|  | 1D | UE-specific search space | Multi-user MIMO |
| Mode 6 | 1A | Common search space (CSS) and UE-specific search space | Transmit diversity |
|  | 1B | UE-specific search space | Closed Loop Spatial Multiplexing using single layer |
| Mode 7 | 1A | Common search space (CSS) and UE-specific search space | If one PBCH antenna port is present, Port #0 is used, and the remaining ports other than Port #0 correspond to Tx diversity. |
|  | 1 | UE-specific search space | Single Antenna Port, Port 5 |
| Mode 8 | 1A | Common search space (CSS) and UE-specific search space | If one PBCH antenna port is present, Port #0 is used, and the remaining ports other than Port #0 correspond to Tx diversity |
|  | 2B | UE-specific search space | Dual-layer transmission of Antenna Ports #7 and #8 or Single Antenna Port of Antenna port #7 or #8 |
| Mode 9 | 1A | Common search space (CSS) and UE-specific search space | If MBSFN subframe is not decided, this means that one PBCH antenna port is present and Port #0 is used. In the remaining cases other than this case, Tx diversity is decided. If MBSFN subframe is decided, this means that single antenna port is used and Port #7 is used. |
|  | 2C | UE-specific search space | 8-Layer Transmission - Use of Ports 7-14 or Single Antenna Port of Antenna Port #7 or #8 |

In Table 5, for example, in case of a transmission (Tx) mode #9, DCI formats (1A, 2C) are transmitted at a first slot, Tx mode. For example, PDSCH associated with a fallback DCI format 1A may be transmitted at a first slot, and PDSCH associated with a DCI format dependent upon Tx mode may be transmitted at a second slot.

Third, a slot for PDSCH transmission may indicate one slot allocation on the condition that a specific flag bit is added to an indicator for resource allocation. For example, if 1-bit flag is used, '0' may indicate allocation of one slot, and '1' may indicate allocation of a subframe unit. In this case, it should be noted that the relationship between the flag bit and the indicated contents may also be reversed as necessary.

Fourth, the embodiment can determine whether single slot allocation is achieved through RRC signaling.

Fifth, a slot for PDSCH transmission may be associated with the search space. In other words, assuming that control information is obtained from a specific search space, data indicated by this control information may be allocated only to a single slot.

For example, if a common search space (CSS) is allocated only to a first slot and a specific UE obtains control information from a first slot, downlink data for the UE may be located only at a second slot. In this case, a first slot to which CSS is allocated, DL data for a UE, and a second slot to which PDSCH is allocated may construct the RB pair.

Figure 11:
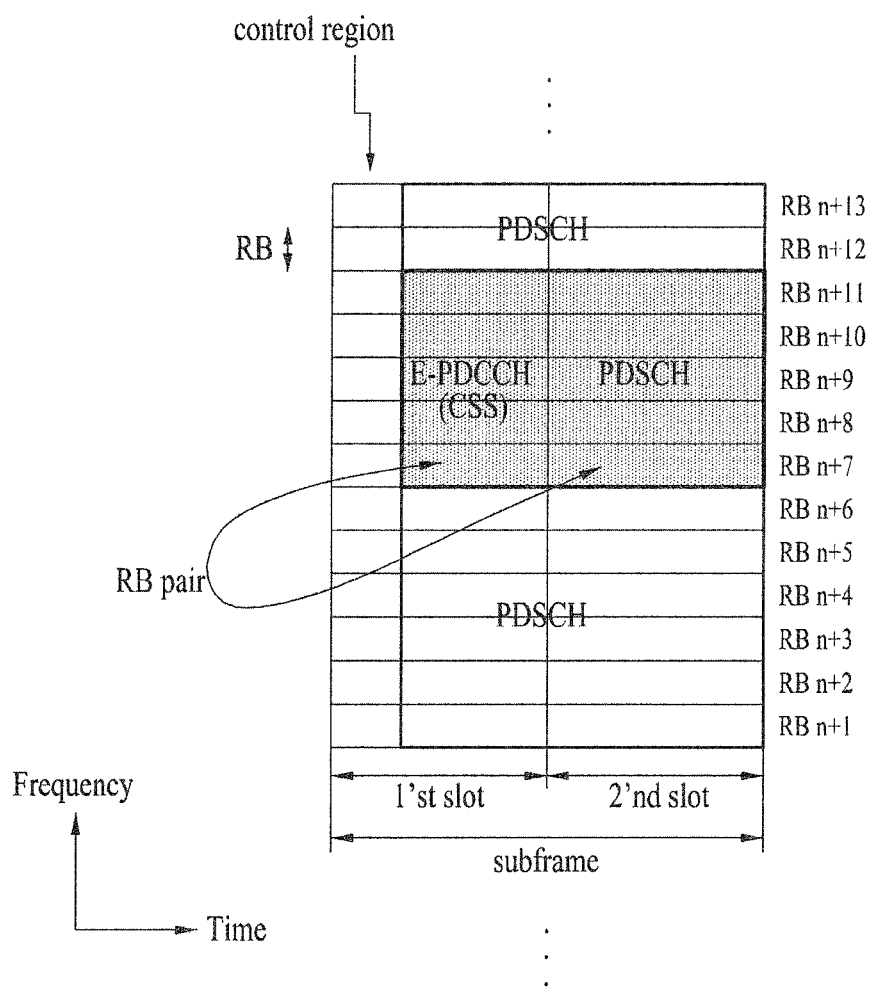
FIGS. 11 and 12 are conceptual diagrams illustrating a method for allocating control information and/or data according to the embodiments of the present invention.
Figure 12:
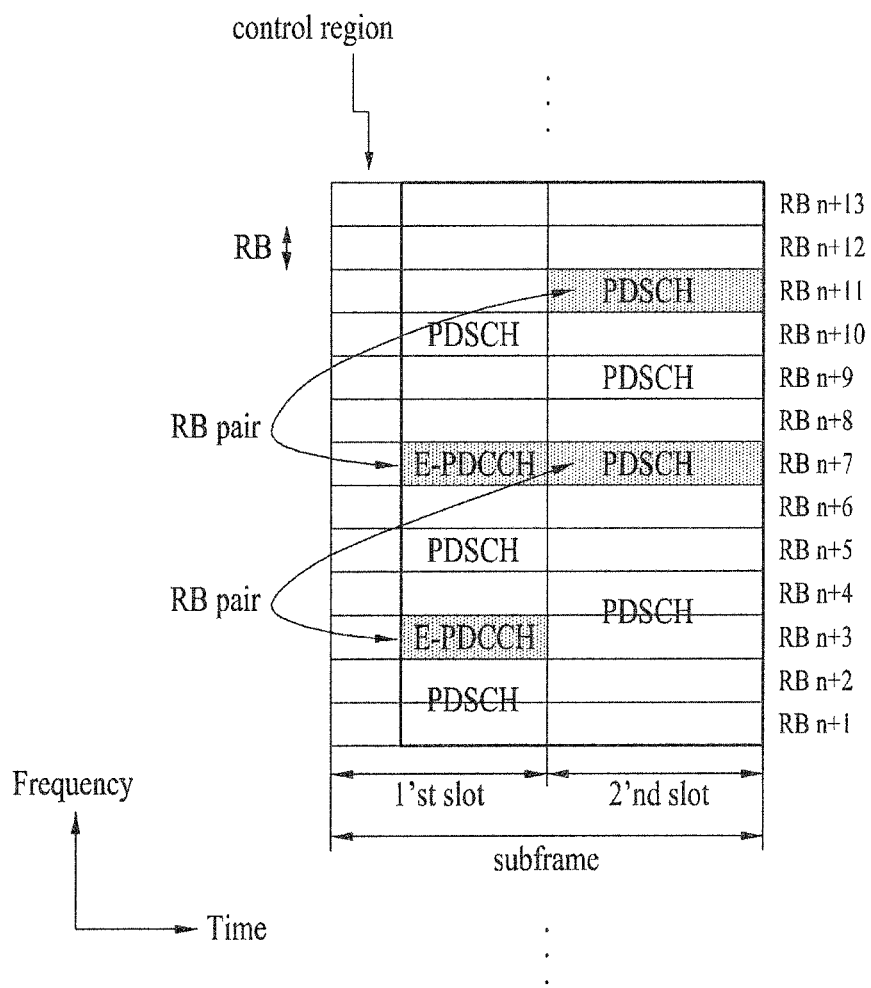

FIGS. 11 and 12 show associated examples of conceptual diagrams illustrating a method for allocating control information and/or data according to the embodiments of the present invention. In more detail, FIG. 11 shows the centralized resource allocation scheme and FIG. 12 shows the distributed resource allocation scheme. Referring to FIG. 11, a common search space (CSS) is allocated from RB index (n+7) to RB index (n+11) at a first slot and it can be recognized that PDSCH associated with DCI at a second slot that is RB-paired with a first slot corresponding to the common search space (CSS) used for DCI transmission is allocated. Similarly, as can be seen from FIG. 12, E-PDCCH is allocated to the RB indexes (n+3, n+7) at the first slot and associated data is allocated to the second slot (indexes n+7, n+11) paired with the first slot to which E-PDCCH is allocated.

Although the above-mentioned description has disclosed that DCI is allocated to the first slot, it should be noted that DCI may also be allocated to the second slot without difficulty. In this case, specific information as to which one of the first slot and the second slot is set to a slot to which DCI is allocated may be predetermined, or may be semi-statically decided through RRC signaling or the like. In addition, the specific information may also be decided according to the Tx mode as mentioned above. For example, in case of Tx mode (X), E-PDCCH may be transmitted to a first slot using a plurality of RBs, and PDSCH may be transmitted to a second slot paired with resources needed for E-PDCCH transmission.

As described above, if a slot for transmission of control information and a slot for transmission of data associated with the control information are identified from each other on an RB basis, UE operations can be achieved as follows. The UE can perform blind decoding for DCI in the search space (CSS or USS) of a first slot within the subframe. In this case, information regarding resources needed for CSS transmission may be signaled to the UE using the legacy PDCCH and RRC signaling or other dynamic methods. Assuming that the UE obtains DCI through blind decoding, it may be possible to obtain a PDSCH associated with DCI in a resource region of the second slot paired with this search space.

Figure 13:
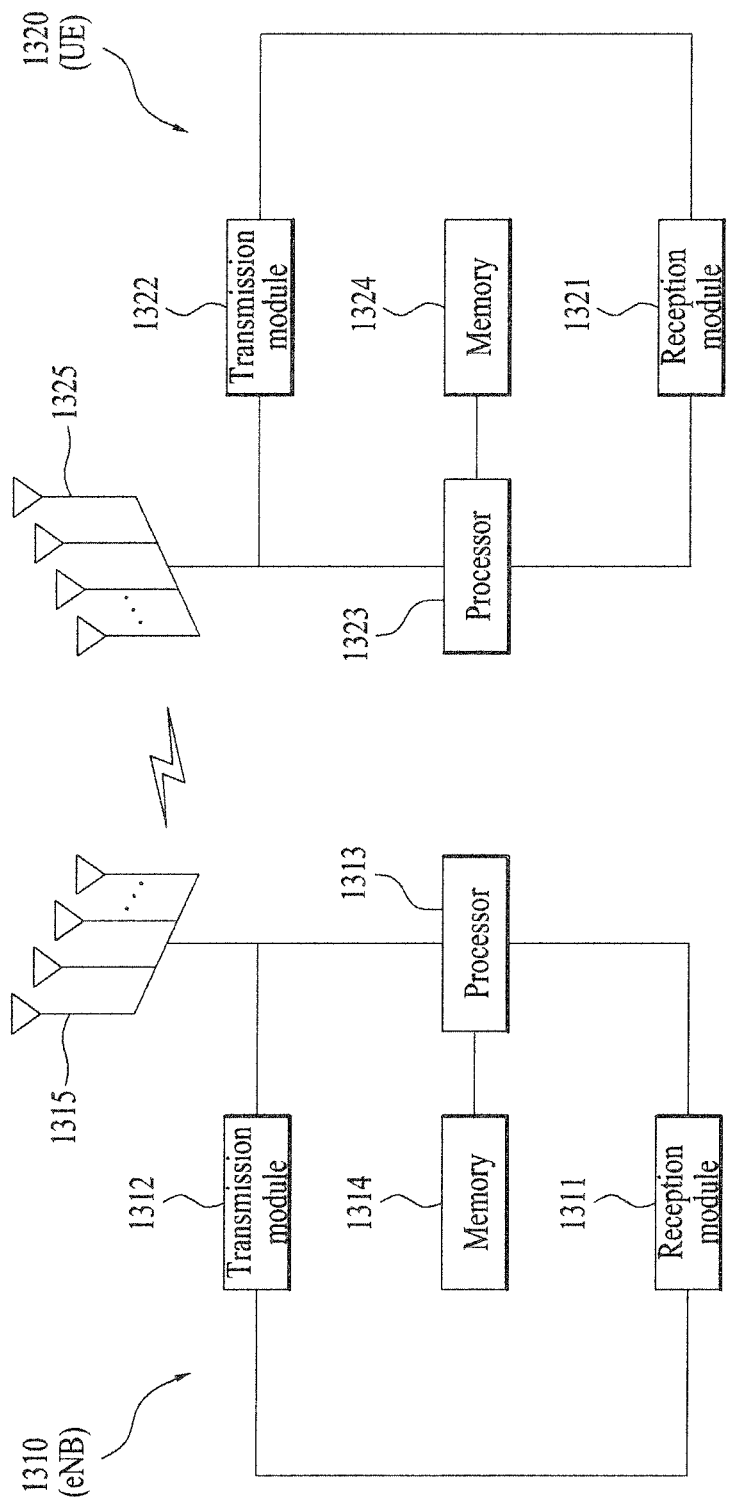
FIG. 13 is a block diagram illustrating a BS (or eNB) device and a UE device according to the embodiments.

FIG. 13 is a block diagram illustrating a BS (eNB) device and a UE device according to the embodiments of the present invention.

Referring to FIG. 13, the BS device 1310 according to the present invention may include a reception (Rx) module 1311, a transmission (Tx) module 1312, a processor 1313, a memory 1314, and a plurality of antennas 1315. The plurality of antennas 1315 indicates the BS device for supporting MIMO transmission and reception. The reception (Rx) module 1311 may receive a variety of signals, data and information on an uplink starting from the UE. The Tx module 1312 may transmit a variety of signals, data and information on a downlink for the UE. The processor 1313 may provide overall control to the BS device 1310. The processor 1313 may be configured to implement the embodiments of the present invention.

The processor 1313 of the BS device 1310 processes information received at the BS device 1410 and transmission information to be transmitted externally. The memory 1314 may store the processed information for a predetermined time. The memory 1314 may be replaced with a component such as a buffer (not shown).

Referring to FIG. 13, the UE device 1320 may include an Rx module 1321, a Tx module 1322, a processor 1323, a memory 1324, and a plurality of antennas 1325. The plurality of antennas 1325 indicates a UE device supporting MIMO transmission and reception. The Rx module 1321 may receive downlink signals, data and information from the BS (eNB). The Tx module 1322 may transmit uplink signals, data and information to the BS (eNB). The processor 1323 may provide overall control to the UE device 1320. The processor 1323 may be configured to implement the embodiments of the present invention.

The processor 1323 of the UE device 1320 processes information received at the UE device 1320 and transmission information to be transmitted externally. The memory 1324 may store the processed information for a predetermined time. The memory 1324 may be replaced with a component such as a buffer (not shown).

The specific configurations of the BS device and the UE device may be implemented such that the various embodiments of the present invention are performed independently or two or more embodiments of the present invention are performed simultaneously. Redundant matters will not be described herein for clarity.

The description of the BS device 1310 shown in FIG. 13 may be applied to the eNB (BS), or may also be applied to a relay node (RN) acting as a DL transmission entity or UL reception entity without departing from the scope or spirit of the present invention. In addition, the description of the UE device 1320 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

Although the embodiments of the present invention have been disclosed on the basis of the 3GPP LTE mobile communication system, the embodiments can be equally or equivalently applied to various wireless communication systems.

The invention claimed is:

1. A method for a base station (BS) transmitting a signal in a wireless communication system, the method comprising:
    allocating downlink control information (DCI) to a data region of a first slot or a second slot of a subframe;
    allocating data associated with the DCI to a data region of a slot different from the slot to which the DCI is allocated; and
    transmitting a subframe including the DCI and the data,
    wherein the DCI is allocated to at least one resource block (RB), and
    wherein the data is allocated to a slot paired with the slot to which the DCI is allocated.

2. The method according to claim 1, wherein the DCI is for cell-specific control information.

3. The method according to claim 1, wherein the data is for user equipments (UEs) that receive the DCI.

4. The method according to claim 1, wherein the slot to which the DCI is allocated is predetermined.

5. The method according to claim 1, wherein the slot to which the DCI is allocated is determined through higher layer signaling.

6. The method according to claim 1, wherein the slot to which the DCI is allocated is determined according to a transmission mode.

7. A method for a user equipment (UE) receiving a signal in a wireless communication system, the method comprising:
    performing blind decoding for downlink control information (DCI) at a data region of a first slot or a second slot of a subframe; and
    acquiring data associated with the DCI at a data region of a slot different from the slot at which the blind decoding is performed,
    wherein a search space in which blind decoding is performed corresponds to at least one resource block (RB), and
    wherein the data is obtained from a slot paired with a specific slot corresponding to the search space.

8. The method according to claim 7, wherein the DCI is for cell-specific control information.

9. The method according to claim 7, wherein the data is for user equipments (UEs) that receive the DCI.

10. The method according to claim 7, wherein the slot at which the blind decoding is performed is predetermined.

11. The method according to claim 7, wherein the slot at which the blind decoding is performed is determined through higher layer signaling.

12. The method according to claim 7, wherein the slot at which the blind decoding is performed is determined according to a transmission (Tx) mode.

13. A base station (BS) for transmitting a signal in a wireless communication system, the BS comprising:
    a transmission module that transmits signals; and
    a processor that:
    allocates downlink control information (DCI) to a data region of a first slot or a second slot of a subframe;
    allocates data associated with the DCI to a data region of a slot different from the slot to which the DCI is allocated; and
    transmits a subframe including the DCI and the data,
    wherein the DCI is allocated to at least one resource block (RB), and
    wherein the data is allocated to a slot paired with the slot to which the DCI is allocated.

14. The BS according to claim 13, wherein the slot to which the DCI is allocated is predetermined.

15. The BS according to claim 13, wherein the slot to which the DCI is allocated is determined through higher layer signaling.

16. The BS according to claim 13, wherein the slot to which the DCI is allocated is determined according to a transmission mode.

17. A user equipment (UE) for receiving a signal in a wireless communication system, the UE comprising:
    a reception (Rx) module that receives signals; and
    a processor that:
    performs blind decoding for downlink control information (DCI) at a data region of any a first slot or a second slot of a subframe; and
    acquires data associated with the DCI at a data region of a slot different from the slot at which the blind decoding is performed,
    wherein a search space in which blind decoding is performed corresponds to at least one resource block (RB), and
    wherein the data is obtained from a slot paired with a specific slot corresponding to the search space.

18. The UE according to claim 17, wherein the slot at which the blind decoding is performed is predetermined.

19. The UE according to claim 17, wherein the slot at which the blind decoding is performed is determined through higher layer signaling.

20. The UE according to claim 17, wherein the slot at which the blind decoding is performed is determined according to a transmission mode.

* * * * *